Patented Nov. 23, 1926.

1,607,696

UNITED STATES PATENT OFFICE.

CURT SCHROEDER AND ALFRED KEIL, OF BERLIN, GERMANY.

TOOTH PASTE AND PROCESS OF MAKING SAME.

No Drawing. Application filed April 15, 1926, Serial No. 102,131, and in Germany November 20, 1924.

The object of this invention is to manufacture a soluble tooth paste or mouth wash without any abrasive matter, that is, a paste which, when used on the tooth-brush or otherwise brought together with water, will be completely dissolved, without producing a residue of Spanish white (precipitated carbonate of lime) or the like, which is injurious to the enamel of the teeth or when remaining between the teeth and the gum will easily cause a separation of the latter from the former.

The product which is obtained according to this invention, therefore, is a mouthwash in the form of a paste. The employment of precipitated chalk or other abrasive matter, which is ordinarily employed for all tooth pastes heretofore in use, for working the same into a paste by means of glycerine, slime of carragheen and flavoring substances, is entirely avoided by this invention.

According to this invention for the manufacture of a tooth paste without abrasive matter, that is to say, a mouth-wash in the form of a paste, an amorphous gelatinous product is used as main constituent, and mixed with glycerine and aromatic constituents to form a paste without any matter having an abrasive effect. As main constituent for the paste according to this invention there may be used an inorganic sucrate, such as a sucrate of silicic hydroxide, a sucrate of manganic hydroxide or a sucrate of aluminic hydroxide, or mixtures of such substances.

These sucrates form a gelatinous deposit, which may be separated from solution by slightly pressing the same.

The residue thus obtained by pressing can be worked up in the usual manner together with flavoring admixtures into a tooth paste which is of such consistency that it may be introduced into tubes. The tooth paste or mouth wash made according to this invention, even when inspected by a magnifying glass, does not contain any crystals, and therefore will be entirely free of any abrasive substances.

We claim:

1. The herein described process of making tooth pastes without abrasive matter, which consists in mixing an amorphous, gelatinous, inorganic sucrate, serving as a carrier for flavoring substances, in the usual manner with glycerine and flavoring substance; and thereupon working the mixture up into a paste.

2. As a product of manufacture, a tooth paste or mouth wash soluble in water, consisting of an amorphous, gelatinous, inorganic sucrate and an admixture of glycerine and flavoring substances.

In testimony whereof we hereunto affix our signatures.

CURT SCHROEDER.
ALFRED KEIL.